United States Patent [19]
Lanning

[11] Patent Number: 5,469,499
[45] Date of Patent: Nov. 21, 1995

[54] SYSTEM FOR SECURING ACCESS TO EQUIPMENT CONNECTABLE TO A TELEPHONE COMMUNICATION CHANNEL

[76] Inventor: Leif Lanning, Route 1, Box 106, Buck Rd., Madrid, N.Y. 13660

[21] Appl. No.: 158,404

[22] Filed: Nov. 29, 1993

[51] Int. Cl.[6] .................................................. H04M 1/70
[52] U.S. Cl. ........................... 379/196; 379/194; 379/200
[58] Field of Search .............................. 379/95, 246, 200, 379/201, 211, 212, 88, 196, 194

[56] References Cited

U.S. PATENT DOCUMENTS

| | | |
|---|---|---|
| 3,516,062 | 6/1970 | Spraker . |
| 3,647,972 | 3/1972 | Glover et al. . |
| 3,665,162 | 5/1972 | Yamamoto et al. . |
| 3,697,693 | 10/1972 | Deschenes et al. . |
| 3,938,090 | 2/1976 | Borison et al. . |
| 3,984,637 | 10/1976 | Caudill et al. . |
| 4,182,933 | 1/1980 | Rosenblum . |
| 4,310,728 | 1/1982 | Dumont . |
| 4,430,728 | 2/1984 | Beitel et al. . |
| 4,469,918 | 9/1984 | Cripps . |
| 4,531,023 | 7/1985 | Levine . |
| 4,532,377 | 7/1985 | Zink . |
| 4,763,351 | 8/1988 | Lipscher et al. . |
| 4,852,154 | 7/1989 | Lewis et al. ............................. 379/246 |
| 4,995,109 | 2/1991 | Arizumi et al. . |
| 5,022,067 | 6/1991 | Hughes ....................................... 379/95 |
| 5,093,856 | 3/1992 | Atkinson et al. ......................... 379/95 |
| 5,131,025 | 7/1992 | Hamasaki .................................. 379/95 |
| 5,181,238 | 1/1993 | Medamana et al. ..................... 379/88 |

*Primary Examiner*—Jeffery A. Hofsass
*Assistant Examiner*—Scott Wolinsky
*Attorney, Agent, or Firm*—Harris Beach & Wilcox

[57] ABSTRACT

A system for accessing equipment connectable to a secured telephone communication channel by sensing ringing current on an access telephone communication channel. Ringing current on the secured channel is controlled such that the secured channel does not answer unless the access channel was called within a preset time period prior to calling the secured channel.

14 Claims, 8 Drawing Sheets

SYSTEM FOR SECURING ACCESS TO EQUIPMENT CONNECTABLE TO A TELEPHONE COMMUNICATION CHANNEL

BACKGROUND OF THE INVENTION

1. Field of the Invention

This invention relates to a system for securing access to equipment connectable to a telephone communication channel.

2. Description of the Related Art

Telephone communication channels provide effortless access to a wide range of equipment. For example, the simple placement of a telephone call can give an authorized user access to a facsimile machine, computer system, cellular telephone, security alarm system, answering machine, or pager. Also, the simple placement of a telephone call can give authorized technicians, as well as machines, access and means to troubleshoot equipment located in remote or inaccessible locations. However, in the same manner, unauthorized users can gain access to the equipment.

The prior art utilizes data encryption schemes, confidential access codes, or access alarms to prevent unauthorized access to, for example, a computer system. While these methods can be effective, a determined, unauthorized user can defeat these methods by using another computer system. The unauthorized user, having obtained access to the computer system, can further obtain confidential information, erase or change information stored on the computer system, or use the computer system to gain access to other systems.

Also, as exemplified in U.S. Pat. No. 4,763,351, the prior art utilizes control signals to prevent unauthorized access. In this method, a first unit at the authorized user's location generates a control signal received at a second unit at the computer's location. The circuits of both units are complex, and the second unit's circuit must be calibrated to the particular control signal being sent from the first unit. Also, in order to use this method, two telephone lines must be available at the authorized user's location.

SUMMARY OF THE INVENTION

It is therefore a primary object of the present invention to improve a system for securing access to equipment connectable to a telephone communication channel.

It is a further object of the present invention to minimize the complexity of a system for securing access to equipment connectable to a telephone communication channel.

It is a still further object of the present invention to simplify the use of a system for securing access to equipment connectable to a telephone communication channel.

It is a yet further object of the present invention to augment cost-effective manufacture of a system for securing access to equipment connectable to a telephone communication channel.

These and other objects of the present invention are attained by a system for securing access to equipment connectable to a telephone communication channel comprising means for sensing ringing current on an access telephone communication channel, means for controlling ringing current on a secure telephone communication channel such that the equipment connectable to the secure telephone communication channel does not answer when ringing current is present on the secure telephone communication channel, means for enabling and disabling the operation of the means for controlling ringing current on the secure telephone communication channel in direct response to the means for sensing ringing current on the access telephone communication channel such that the means for controlling ringing current on the secure telephone communication channel is disabled when ringing current is sensed on the access telephone communication channel, and means for maintaining the disabled state of the means for controlling ringing current on the secure telephone communication channel for a pre-set time period after ringing current is first sensed on the access telephone communication channel.

BRIEF DESCRIPTION OF THE DRAWING

For a better understanding of these and other objects of the present invention, reference is made to the detailed description of the invention which is to be read in conjunction with the following drawings, wherein.

DESCRIPTION OF THE PREFERRED EMBODIMENT

Figure 1:
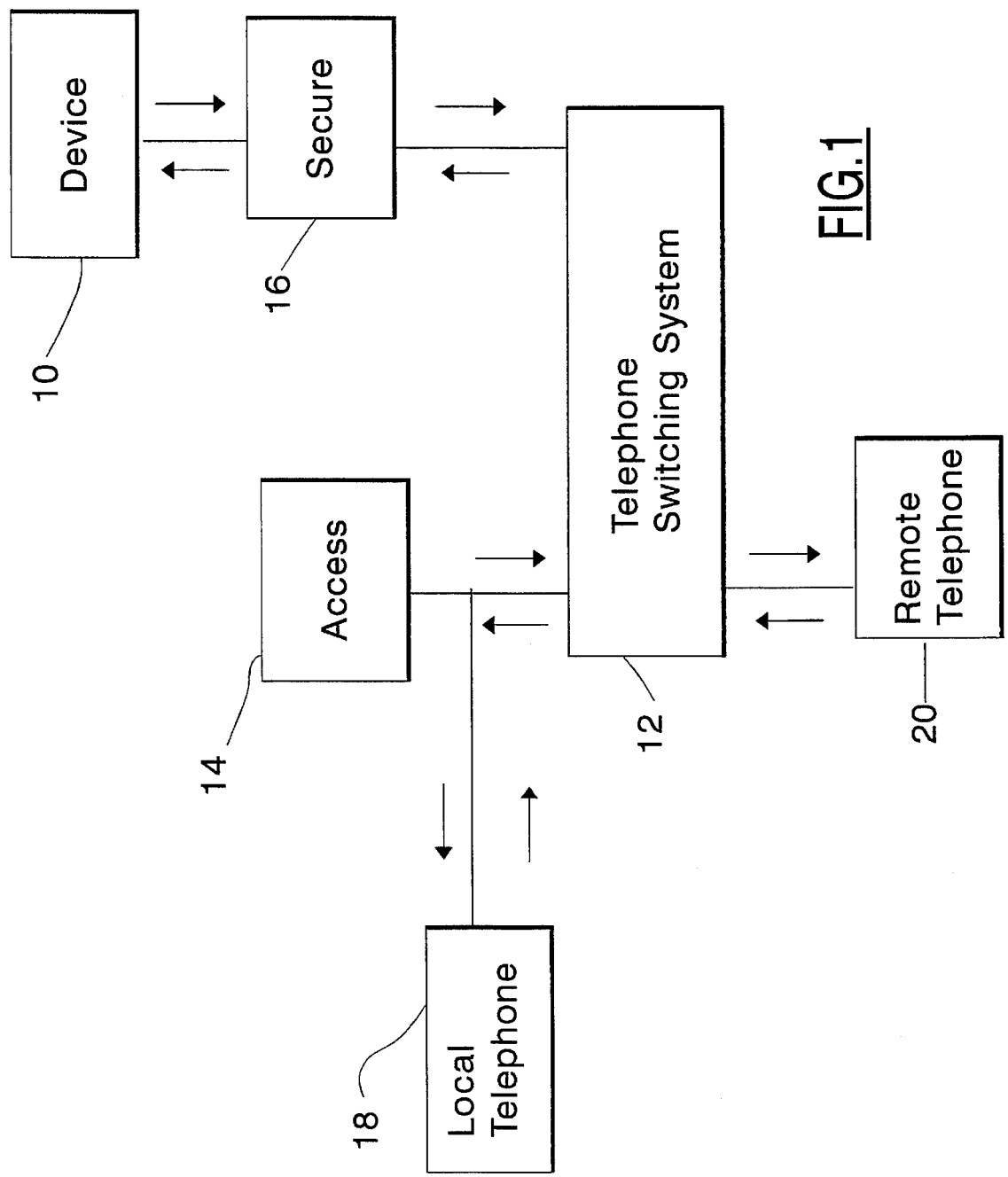
FIG. 1 is a block diagram of the present invention with one access telephone communication channel and one secure telephone communication channel.

In FIG. 1, a device 10 is connected through a secure telephone communication channel 16 to a telephone switching system 12. An access telephone communication channel 14 is also connected to the telephone switching system 12.

In operation, the access channel 14 allows incoming and outgoing access to the telephone switching system 12. It also provides a standard channel for communications. However, the secure channel 16 allows outgoing access to the telephone switching system 12 from the device 10, but prevents incoming access from the telephone switching system 12 to the device 10. Once access is made, the secure channel 16 provides a standard channel for communications. As a result, the device 10 has effortless access to the telephone switching system 12, but an unauthorized user cannot obtain access to the device 10. A local telephone 18 could be connected through the access channel 14 to the telephone switching system 12.

In order to obtain access to device 10, an authorized user from, for example, a remote telephone 20, places a telephone call to the access channel 14. The access channel 14 senses the ringing current of the telephone call and disables, for a pre-set period of time, the function of the secure channel 16 to prevent incoming access from the telephone switching system 12 to the device 10. Within that pre-set period of time, the authorized user then places another telephone call from the remote telephone 20 to the secure channel 16 and the device 10 will now answer the incoming telephone call.

Figure 2:
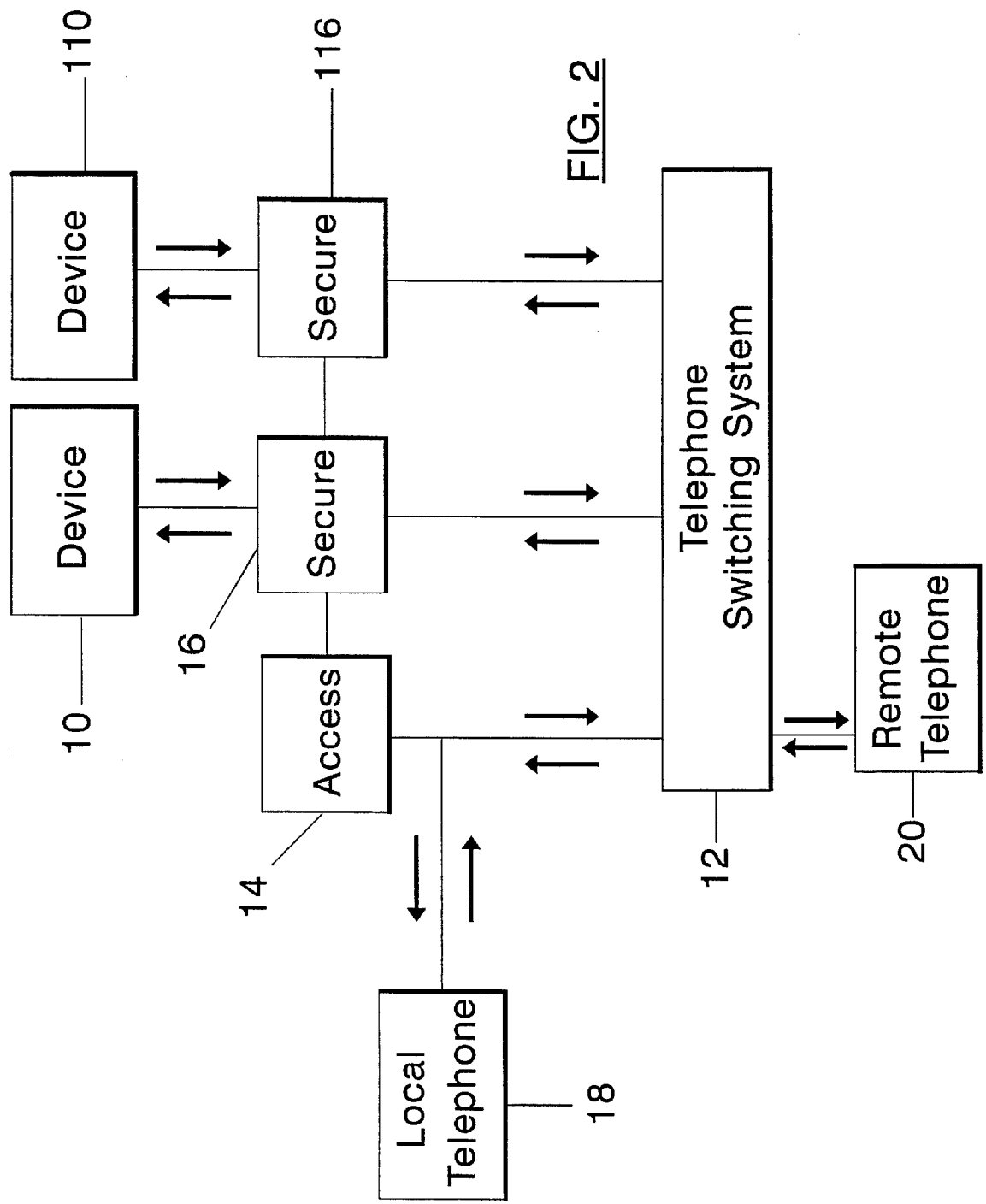
FIG. 2 is a block diagram of the present invention with one access telephone communication channel and two secure telephone communication channels.

In FIG. 2, a device 110 is connected through a secure telephone communication channel 116 to the telephone switching system 12. The secure channels 16 and 116 operate independent of each other. For example, when the device 10 is communicating through the secure channel 16 to the telephone switching system 12, the secure channel 116 continues to prevent incoming access from the telephone switching system 12 to the device 110. When an authorized user places a telephone call to the access channel 14, the communication on the secure channel 16 continues uninterrupted. However, the secure channel 116 is disabled and the authorized user's subsequent telephone call within the pre-set period of time to the secure channel 116 will now have access to the device 110.

When the authorized user's telephone call to the access channel 14 disables both secure channels 16 and 116, the subsequent communication within the pre-set period of time to, for example, secure channel 16 will not be interrupted when the pre-set period of time lapses. At the lapse of the pre-set period of time, the secure channel 116 will once again prevent incoming access from the telephone switching system 12 to the device 110. The authorized user, on the secure channel 16, continues communication with the device 10.

Figure 3:
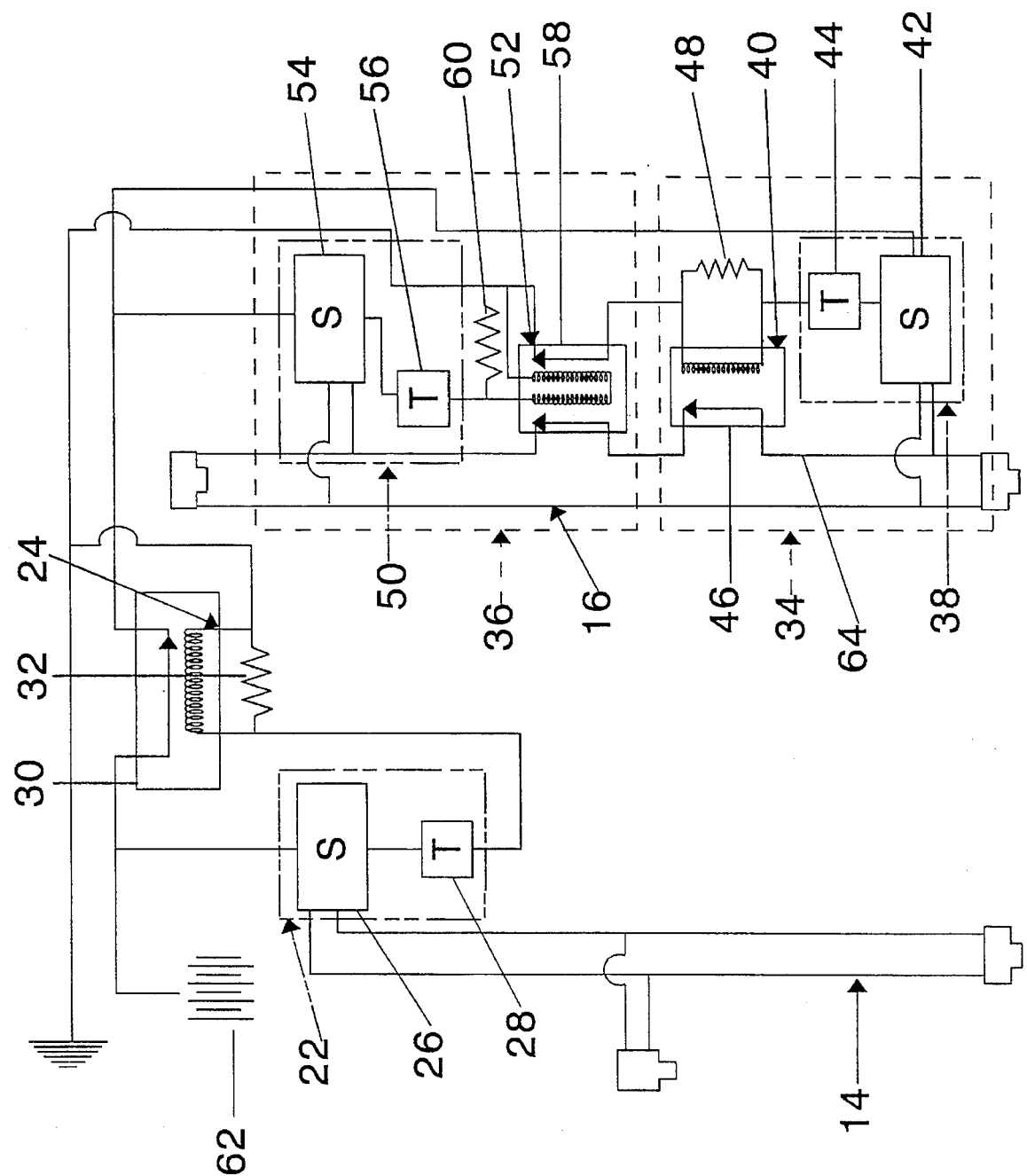
FIG. 3 is a schematic diagram of the present invention with one access telephone communication channel and one secure telephone communication channel.

In FIG. 3, the access channel 14 is connected to a sensing circuit 22 in series with a disable-time circuit 24. The sensing circuit 22 comprises a ringer isolator 26 in series with a bi-metallic switch 28. The disable-time circuit 24 comprises a single-throw normally closed relay 30 in parallel with a resistor 32.

The secure channel 16 is connected to a control circuit 36 in series with a back-up control circuit 34. The back-up control circuit 34 comprises a sensing circuit 38 in series with a disable-time circuit 40. The sensing circuit 38 comprises a ringer isolator 42 in series with a bi-metallic switch 44. The disable-time circuit 40 comprises a single-throw normally closed relay 46 in parallel with a resistor 48.

The control circuit 36 comprises a sensing circuit 50 in series with a disable-time circuit 52. The sensing circuit 50 comprises a ringer isolator 54 in series with a bi-metallic switch 56. The disable-time circuit 52 comprises a double-throw normally closed relay 58 in parallel with a resistor 60.

In FIG. 3, when a telephone call is placed on the access channel 14, alternating current, referred to as ringing current, is placed across the access channel 14. The ringer isolator 26 senses this ringing current. In the presence of ringing current, the ringer isolator 26 closes and direct current flows to the bi-metallic switch 28 and the disable-time circuit 24. In the disable-time circuit 24, the single-throw normally closed relay 30 opens. When relay 30 opens, the control circuit 36 and the back-up control circuit 34 are disconnected from a power source 62.

As the bi-metallic switch 28 heats up and opens, the ringer isolator 26 is disconnected from the power source 62 and, in turn, the ringer isolator 26 opens. With the opening of the bi-metallic switch 28, the direct current to the single-throw normally closed relay 30 is interrupted and the relay 30 closes. The control circuit 36 and the back-up control circuit 34 are reconnected to the power source 62. The combined parallel impedance of the resistor 32 and the single-throw normally closed relay 30 controls the operation of the bi-metallic switch 28. In the present invention, the bi-metallic switch 28 heats up and opens in 1.5 minutes. The time can be changed in accordance with the application.

When ringing current has not been applied to the access channel 14, the secure channel 16 prevents incoming access from the telephone switching system 12 to the device 10, but allows touch-tone dialing from the device 10 to the telephone switching system 12. When an incoming telephone call is placed on the secure channel 16, ringing current is placed across the secure channel 16. The ringer isolators 42 and 54 sense this ringing current. In the presence of ringing current, the ringer isolators 42 and 54 close and direct current flows to the bi-metallic switches 44 and 56 and the disable-time circuits 40 and 52. In the disable-time circuit 40, the single-throw normally closed relay 46 opens. In the disable-time circuit 52, the double-throw normally closed relay 58 opens. The relays 46 and 58 open a ring side of the line 64 of the secure channel 16 and disconnect the device 10 from the telephone switching system 12. Also, with the opening of the double-throw normally closed relay 58, the disable-time circuit 40 and the sensing circuit 38 are disconnected from the power source 62. As a result, the single-throw normally closed relay 46 closes, the bi-metallic switch 44 begins to cool down, and the ringer isolator 42 opens.

In the interim, the double-throw normally closed relay 58 keeps the ring side of the line 64 of the secure channel 16 open until the bi-metallic switch 56 heats up and opens. In turn, the ringer isolator 54 opens and the double-throw normally closed relay 58 closes. If ringing current is still present on the secure channel 16, the ringer isolator 42 closes, the bi-metallic switch 44 begins to heat up, the single-throw normally closed relay 46 opens, and the ring side of the line 64 of the secure channel 16 opens.

If ringing current is still present on the secure channel 16 when the bi-metallic switch 44 opens, the ringer isolator 54 closes, the bi-metallic switch 56 begins to heat up, the double-throw normally closed relay 58 opens, and the ring side of the line 64 of the secure channel 16 opens. When the bi-metallic switch 56 opens, and ringing current remains on the secure channel 16, the cycle begins again with the closure of the double-throw normally closed relay 58. The combined parallel impedance of the single-throw normally closed relay 46 and the resistor 48 control the operation of the bi-metallic switch 44, and the combined parallel impedance of the double-throw normally closed relay 58 and the resistor 60 control the operation of the bi-metallic switch 56.

In the present invention, the bi-metallic switches 44 and 56 heat up and open in 15 seconds. In 15 seconds, three bursts of ringing current, i.e. three rings, are placed across the secure channel 16. In most computer system to computer system applications employed by unauthorized users, when the called computer system does not answer after three "rings", the unauthorized calling computer system will "hang-up" the telephone line. The timing can be changed in accordance with the application.

The relevant values of the components in FIG. 3 are as follows:

| Ringer Isolators 26, 42 and 54 | TII Industries 810R1 |
|---|---|
| Single-Throw Relays | 320 Ohms |

| | |
|---|---|
| 30 and 46 Double-Throw Relay 58 | 280 Ohms |
| Bi-metallic Switches 28, 44 and 56 | 4.7 Volts D.C. |
| Resistors 48 and 60 | 50 ohms |
| Resistor 32 | 56 Ohms |

Figure 4:
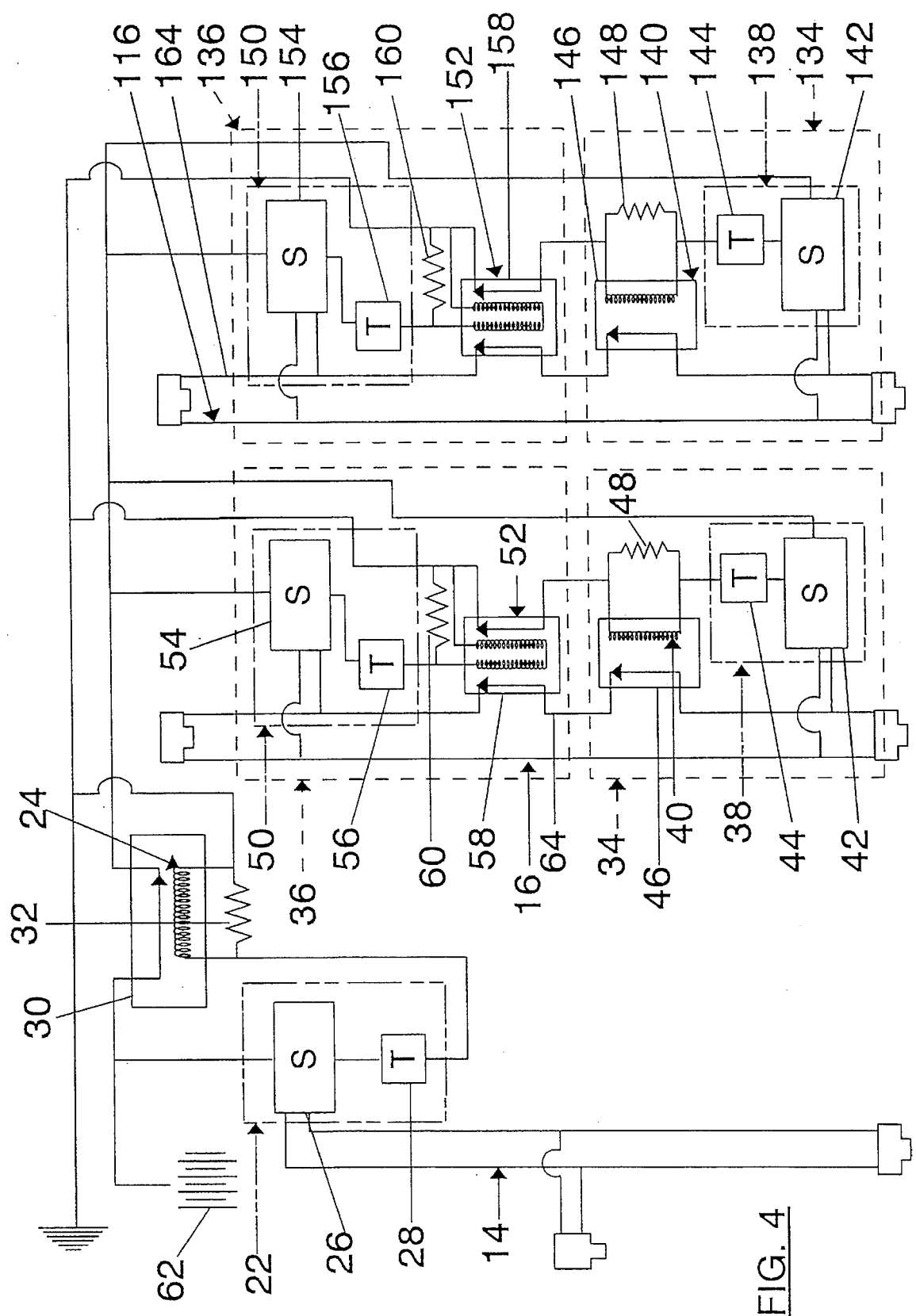
FIG. 4 is a schematic diagram of the present invention shown in FIG. 3 with one access telephone communication channel and two secure telephone communication channels.

In FIG. 4, an alternate embodiment of the invention operates in the manner shown in FIG. 3, except that the secure channel 116 has been added. The secure channel 116 operates in the manner of the secure channel 16 shown in FIG. 3. The corresponding components are referenced with numerals advanced by 100. Additional secure channels (not shown) also operate in the manner of the secure channel 16 shown in FIG. 3. All secure channels operate independent of other secure channels, as shown in FIG. 2.

Figure 5:
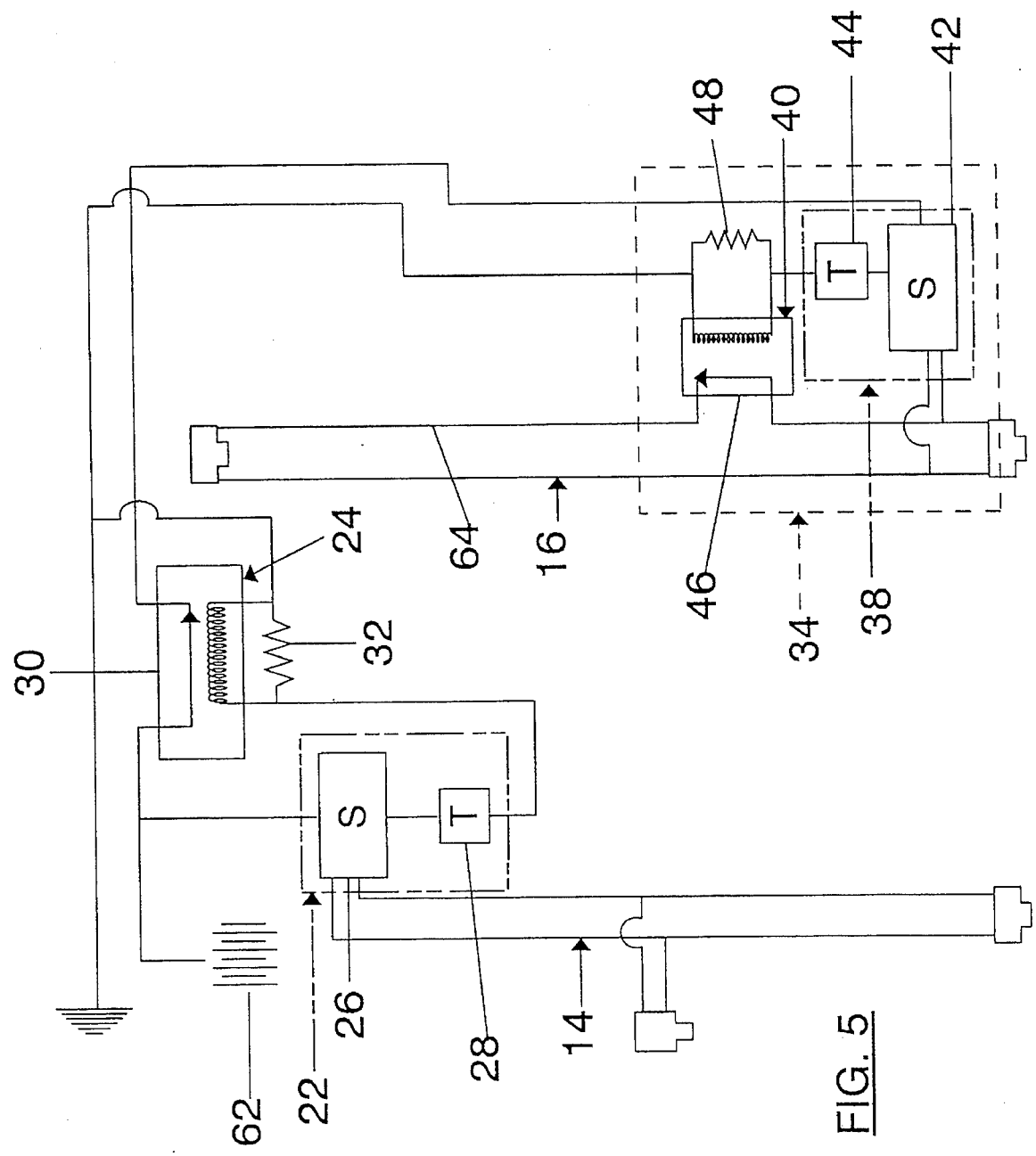
FIG. 5 is a schematic diagram of the present invention shown in FIG. 3 with one access telephone communication channel and an alternate embodiment of the secure telephone communication channel.

In FIG. 5, another alternate embodiment of the invention operates in the manner shown in FIG. 3, except that the control circuit 36 has been removed. In this embodiment, the amount of time needed for the bi-metallic switch 44 to open and close corresponds to the arrangement of ringing current on the secure channel 16. In the present invention, the bi-metallic switch 44 heats up and opens with each burst of ringing current and closes prior to the next burst of ringing current. In this manner, the ring side of the line 64 of the secure channel 16 is kept open without the presence of the control circuit 36.

Figure 6:
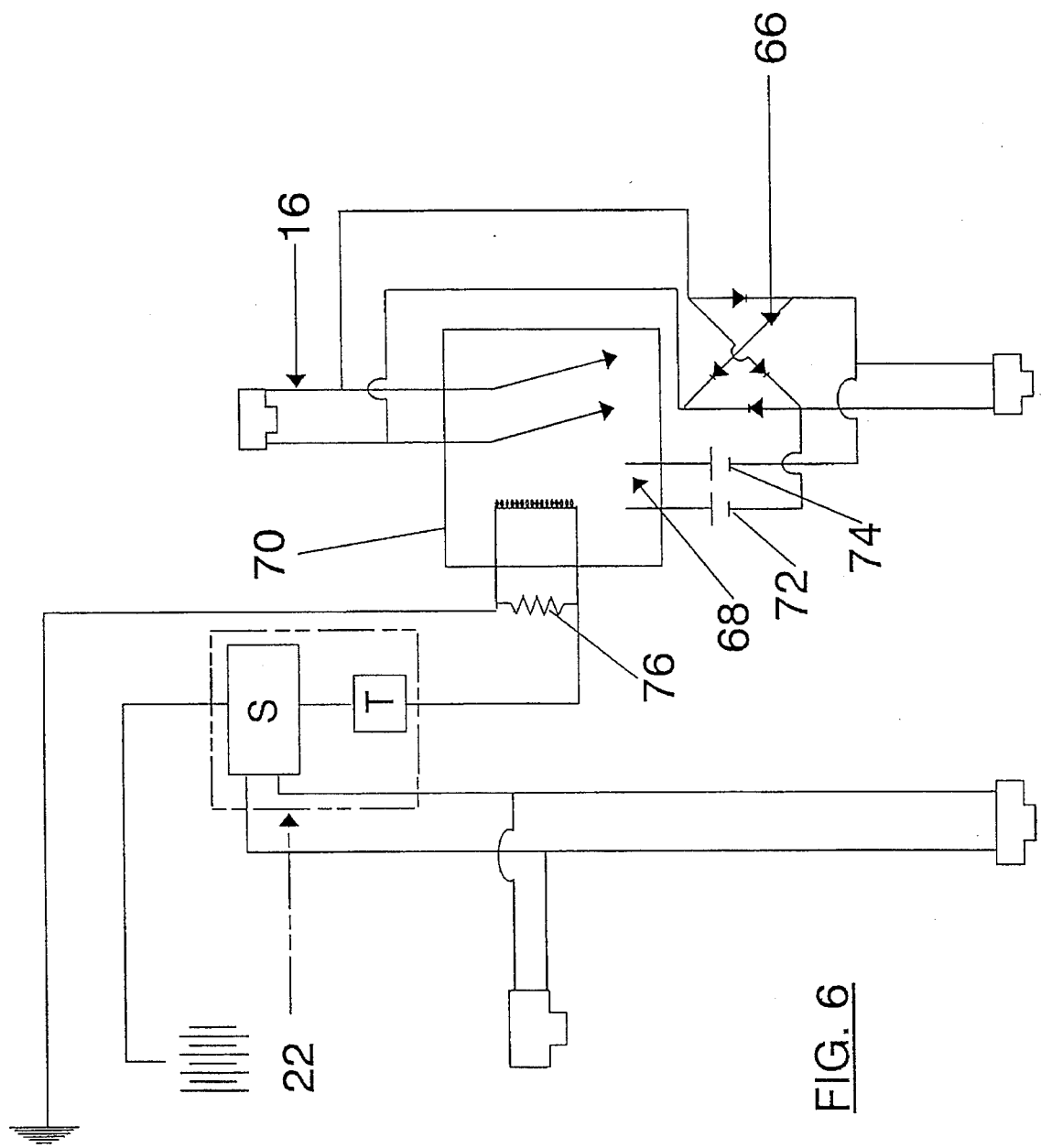
FIG. 6 is a schematic diagram of an alternate embodiment of the present invention with one access telephone communication channel and one secure telephone communication channel.

In FIG. 6, the secure channel 16 is connected to the device 10 through an ac-dc converter 66. The secure channel 16 is also connected to a pole 68 of a double-throw normal open relay 70 through capacitors 72 and 74. The access channel 14 is connected to the sensing circuit 22 in series with the parallel combination of the double-throw relay 70 and a resistor 76.

In operation, when ringing current is not present on the access channel 14, the ac-dc converter 66 prevents the alternating ringing current from reaching the device 10. When ringing current is present on the access channel 14, the ringer isolator 26 closes, the bi-metallic switch 28 heats up, and the double-throw relay 70 closes for a pre-set period of time. The capacitors 72 and 74 now provide a path for the alternating ringing current to reach the device 10. The combined parallel impedance of the resistor 76 and the double-throw relay 70 control the operation of the bi-metallic switch 28. In the present invention, the bi-metallic switch 28 heats up and opens in 1.5 minutes. The time can be changed in accordance with the application.

The relevant values of the components in FIG. 6 are as follows:

| | |
|---|---|
| Double-Throw Relay 70 | 280 Ohms |
| AC-DC Converter 66 | 600 Volt – 1 Amp Silicon Diodes |
| Capacitors 72 and 74 | .31 microfarads |
| Resistor 76 | 58 ohms |

Figure 7:
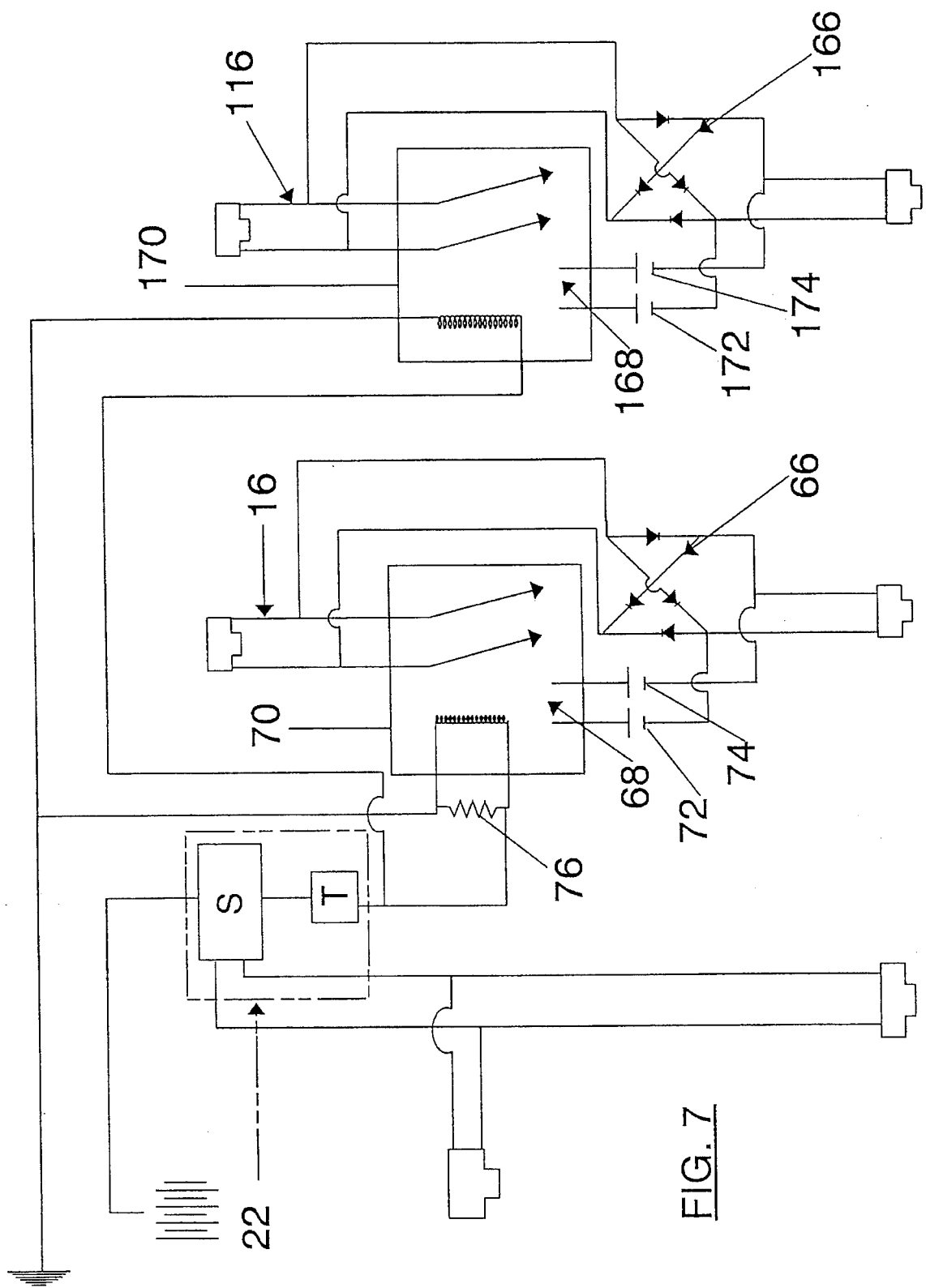
FIG. 7 is a schematic diagram of the present invention shown in FIG. 6 with one access telephone communication channel and two secure telephone communication channels.

In FIG. 7, an alternate embodiment of the invention operates in the manner shown in FIG. 6, except that the secure channel 116 has been added. The secure channel 116 operates in the manner of the secure channel 16 shown in FIG. 6. The corresponding components are referenced with numerals advanced by 100. Additional secure channels (not shown) also operate in the manner of the secure channel 16 shown in FIG. 6. All secure channels operate independent of other secure channels, as shown in FIG. 2.

Figure 8:
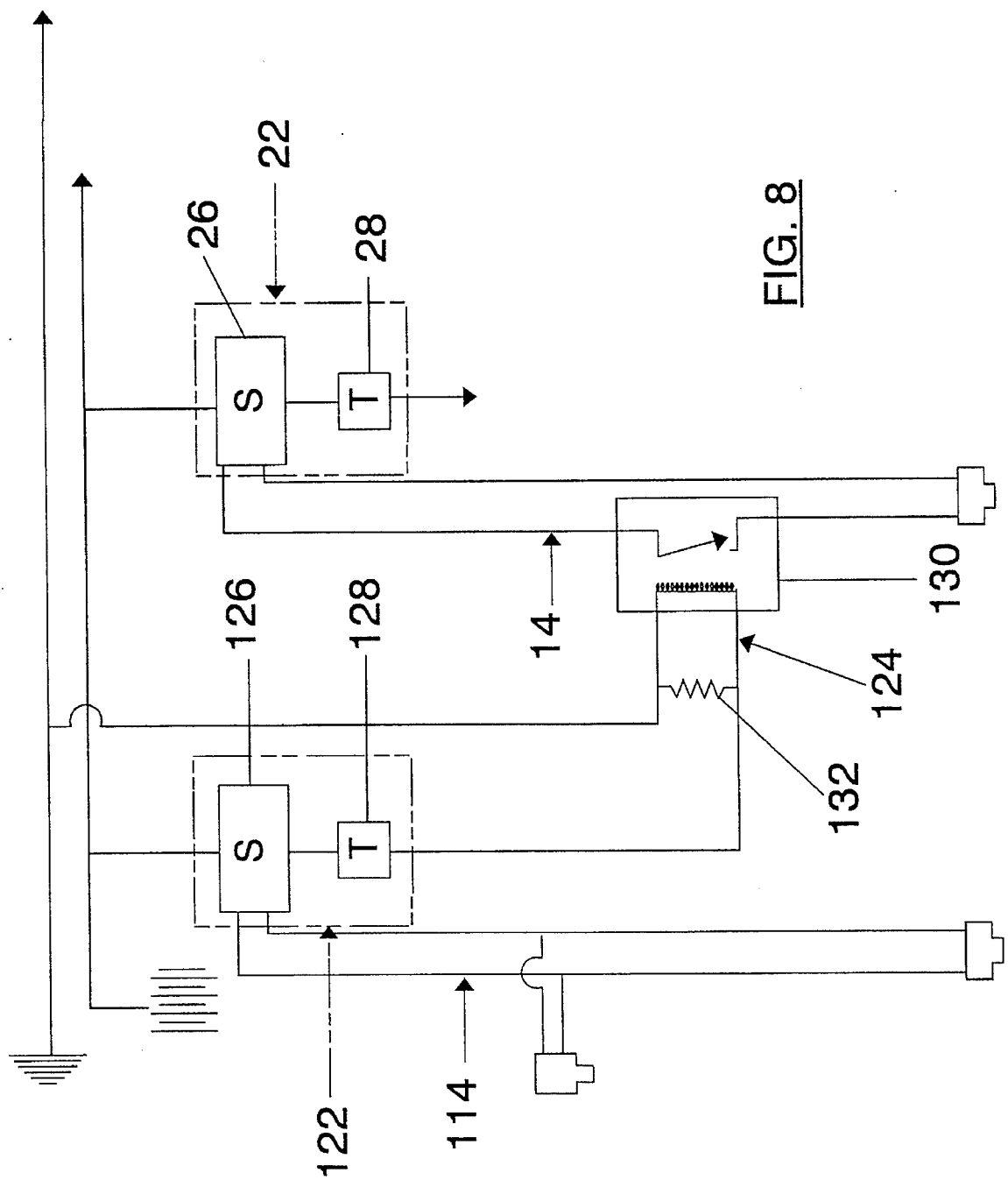
FIG. 8 is a schematic diagram of the present invention with two access telephone communication channels.

In FIG. 8, an alternate embodiment of the invention operates in the manner shown in FIG. 3 or FIG. 6, except that an access channel 114 has been added. The access channel 114 is connected to a sensing circuit 122 in series with a disable-time circuit 124. The sensing circuit 122 comprises a ringer isolator 126 in series with a bi-metallic switch 128. The disable-time circuit 124 comprises a single-throw normally opened relay 130 in parallel with a resistor 132.

When a telephone call is placed on the access channel 114, the ringer isolator 126 closes and direct current flows to the bi-metallic switch 128 and the disable-time circuit 124. In the disable-time circuit 124, the single-throw normally open relay 130 closes. When relay 130 closes, the secure channel 14 is accessible to the remote authorized user for a pre-set period of time. The combined parallel impedance of the resistor 132 and the single-throw normally open relay 130 controls the operation of the bi-metallic switch 128. In the present invention, the bi-metallic switch 128 heats up and opens in 1.5 minutes. The time can be changed in accordance with the application.

The relevant values of the components in FIG. 8 are as follows:

| | |
|---|---|
| Ringer Isolator 126 | TII Industries 810R1 |
| Bi-metallic Switch 128 | 4.7 Volts D.C. |
| Single-Throw Relay 130 | 320 Ohms |
| Resistor 132 | 58 Ohms |

While this invention has been explained with reference to the structure disclosed herein, it is not confined to the details set forth and this application is intended to cover any modifications and changes as may come within the scope of the following claims:

What is claimed is:

1. A system for securing access to equipment connectable to a telephone communication channel, comprising:

a first sensing means for sensing ringing current on a first access telephone communication channel, a controlling means for controlling ringing current on a secure telephone communication channel such that the equipment connectable to the secure telephone communication channel does not answer when ringing current is present on the secure telephone communication channel, means for disabling the controlling means in direct response to the first sensing means when ringing current is sensed on the first access telephone communication channel, and a first maintaining means for maintaining the disabled state of the controlling means for a pre-set time period after ringing current is first sensed on the first access telephone communication channel.

2. The system for securing access of claim 1 wherein the first sensing means includes a ringer isolator in series with a bi-metallic switch.

3. The system for securing access of claim 1 wherein the means for disabling includes a single-throw normally closed relay.

4. The system for securing access of claim 3 wherein the first maintaining means includes a resistor in parallel with the single-throw normally closed relay such that the combined parallel impedance determines the pre-set time period for disablement.

5. The system for securing access of claim 3 wherein the controlling means includes:
- a first circuit of a ringer isolator in series with a bi-metallic switch,
- a second circuit of a single-throw normally closed relay in parallel with a resistor, and
- the first circuit in series with the second circuit such that the single-throw normally closed relay disconnects the secure communication channel from the equipment connectable to the secure communication channel.

6. The system for securing access of claim 3 wherein the controlling means includes:
- a first circuit of a first ringer isolator in series with a first bi-metallic switch,
- a second circuit of a single-throw normally closed relay in parallel with a first resistor,
- a third circuit of a double-throw normally closed relay in parallel with a second resistor,
- a fourth circuit of a second ringer isolator in series with a second bi-metallic switch,
- the first circuit in series with the second circuit,
- the second circuit in series with the third circuit, and
- the third circuit in series with the fourth circuit such that the single-throw normally closed relay and the double-throw normally closed relay disconnect the secure communication channel from the equipment connectable to the secure communication channel.

7. The system for securing access of claim 1 wherein the means for disabling includes a double-throw normally open relay in series with a pair of capacitors.

8. The system for securing access of claim 7 wherein the first maintaining means includes a resistor in parallel with the double-throw normally open relay such that the combined parallel impedance determines the pre-set time period for disablement.

9. The system for securing access of claim 7 wherein the controlling means includes an ac-dc converter.

10. The system for securing access of claim 1, further comprising:
- a second access telephone communication channel,
- a second sensing means for sensing ringing current on the second access telephone communication channel,
- an activation means for activating and de-activating the operation of the first sensing means such that the first sensing means is activated when ringing current is sensed on the second access telephone communication channel, and
- a second maintaining means for maintaining the activated state of the activation means for a pre-set period of time after ringing current is first sensed on the second access telephone communication channel.

11. The system for securing access of claim 10 wherein the second sensing means includes a ringer isolator in series with a bi-metallic switch.

12. The system for securing access of claim 10 wherein the activation means includes a single-throw normally open relay.

13. The system for securing access of claim 12 wherein the second maintaining means includes a resistor in parallel with the single-throw normally open relay such that the combined parallel impedance determines the pre-set time period for disablement.

14. A method for securing access to equipment connectable to a telephone communication channel comprising the steps of:
- monitoring the presence of ringing current on an access telephone communication channel and a secure telephone communication channel,
- preventing the equipment connectable to the secure telephone communication channel from answering when ringing current is present on the secure telephone communication channel if ringing current is not sensed on the access telephone communication channel,
- disabling the prevention of the equipment from answering when ringing current is present on the secure telephone communication channel if ringing current is sensed on the access telephone communication channel,
- maintaining the disablement for a pre-set time period after ringing current is first sensed on the access telephone communication channel, and
- enabling after said pre-set time period the prevention of the equipment from answering when ringing current is present on the secure telephone communication channel.

* * * * *